United States Patent [19]

Ewald

[11] Patent Number: 4,872,862

[45] Date of Patent: Oct. 10, 1989

[54] METHOD AND APPARATUS FOR MANUFACTURING DISPLAY COMPRISING LIGHT-EMITTING DIODES

[76] Inventor: Rolf V. T. Ewald, Cirkelvagen 55, S-310 31 Eldsberga, Sweden

[21] Appl. No.: 173,177

[22] Filed: Mar. 24, 1988

Related U.S. Application Data

[60] Continuation-in-part of Ser. No. 895,460, Aug. 11, 1986, abandoned, which is a division of Ser. No. 613,091, May 22, 1984, Pat. No. 4,628,422, which is a continuation-in-part of Ser. No. 463,540, Feb. 3, 1983, abandoned.

[30] Foreign Application Priority Data

Feb. 16, 1982 [SE] Sweden ............................... 8200913

[51] Int. Cl.⁴ ........................ B23P 15/00; B21D 28/32

[52] U.S. Cl. ..................................... 445/22; 29/592.1; 72/7; 72/334; 72/447; 83/76.1; 364/474.02

[58] Field of Search ..................... 72/7, 446, 447, 454, 72/294, 306, 327, 333, 334; 83/71, 72, 560, 556; 364/474.02; 29/592.1; 445/22, 23

[56] References Cited

U.S. PATENT DOCUMENTS

| | | | |
|---|---|---|---|
| 1,158,874 | 11/1915 | Walker | 72/446 |
| 2,432,804 | 12/1947 | Rieske | 72/334 |
| 2,785,751 | 3/1957 | Jones | 83/560 |
| 3,290,539 | 12/1966 | Lamorte | 313/500 |
| 3,314,331 | 4/1967 | Wiley | 362/296 |
| 3,512,027 | 5/1970 | Kupsky | 313/499 |
| 3,683,731 | 8/1972 | Oppenheim et al. | 83/71 |
| 3,737,647 | 6/1973 | Gomi | 362/104 |
| 3,737,722 | 6/1973 | Scharlack | 340/373 |
| 3,821,775 | 6/1974 | Biard | 317/235 N |
| 3,835,741 | 9/1974 | Anderson et al. | 83/71 |
| 3,879,979 | 4/1975 | Arai et al. | 72/7 |
| 3,894,225 | 7/1975 | Chao | 362/249 |
| 3,950,844 | 4/1976 | Wisbey | 29/577 |
| 3,978,332 | 8/1976 | Taltavyll et al. | 362/223 |
| 3,978,748 | 9/1976 | Leslie et al. | 83/71 |
| 3,995,152 | 11/1976 | Chao et al. | 362/101 |
| 4,056,733 | 11/1977 | Prestridge | 307/115 |
| 4,152,618 | 5/1979 | Abe et al. | 313/113 |
| 4,164,008 | 8/1979 | Miller et al. | 362/103 |
| 4,173,035 | 10/1979 | Hoyt | 362/249 |
| 4,178,820 | 12/1979 | Gerber | 83/71 |
| 4,225,380 | 9/1980 | Wickens | 29/569 L |
| 4,271,408 | 6/1981 | Teshima et al. | 340/782 |
| 4,308,572 | 12/1981 | Davidson et al. | 362/103 |
| 4,336,580 | 6/1982 | Mouyard et al. | 362/347 |
| 4,381,537 | 4/1983 | Hinrichs | 362/78 |
| 4,481,533 | 11/1984 | Alzmann et al. | 364/474.02 |
| 4,725,961 | 2/1988 | Pearl | 83/71 |

FOREIGN PATENT DOCUMENTS

| | | | |
|---|---|---|---|
| 2451542 | 10/1980 | France | 262/249 |
| 1560010 | 1/1980 | United Kingdom . | |

*Primary Examiner*—Daniel C. Crane
*Attorney, Agent, or Firm*—Harness, Dickey & Pierce

[57] ABSTRACT

A display incorporating light-emitting diodes, comprising a reflector which is formed in a holder. A light-emitting diode is mounted in the holder and projects into the reflector through an opening. The light-emitting doide is attached in the opening with the diode walls snugly abutting against the edges of the opening. The invention also relates to a method of manufacturing the display comprising light-emitting diodes and an installation to perform the method. Each diode is provided with two connections protected by the holder. The holder consists of surface-treated sheet metal, preferably anodized aluminium. The reflector is bowl-shaped and semispherical. Owing to the reflector a bundle of aligned beams of light is emitted from the light-emitting diode.

2 Claims, 5 Drawing Sheets

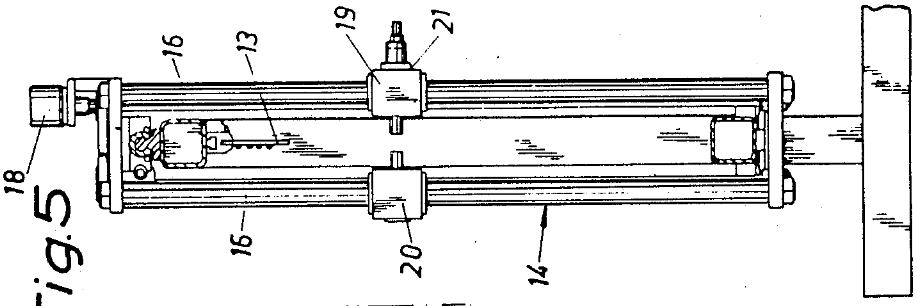
Fig.5
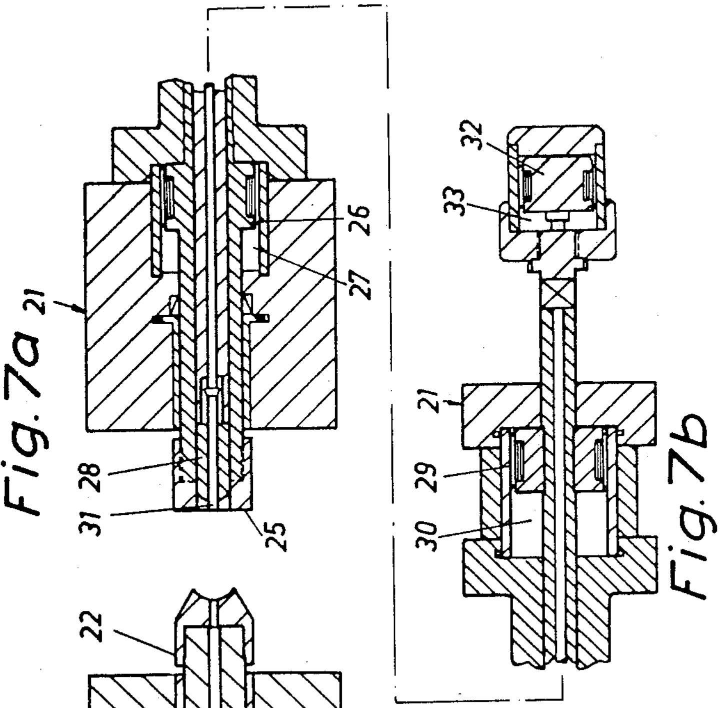
Fig.7a
Fig.7b
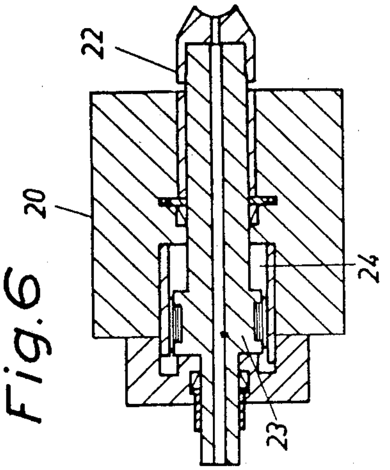
Fig.6

METHOD AND APPARATUS FOR MANUFACTURING DISPLAY COMPRISING LIGHT-EMITTING DIODES

CROSS REFERENCE TO RELATED APPLICATIONS

This is a continuation-in-part of U.S. Ser. No. 895,460, filed Aug. 11, 1986, now abandoned, which is a division of U.S. Ser. No. 613,091, filed May 22, 1984, now U.S. Pat. No. 4,628,422, issued Dec. 9, 1986, which is a continuation-in-part of U.S. Ser. No. 463,540, filed Feb. 3, 1983, now abandoned, which is based upon and claims priority from Swedish application Ser. No. 8200913-5, filed Feb. 16, 1982.

BACKGROUND OF THE INVENTION

The present invention concerns a display comprising light-emitting diodes, and a method and an installation for its manufacture. The display is suitable for use in a variety of different applications, such as for illumination of signs, and for lighting purposes on cars, to mention only a few.

Light-emitting diodes have several advantages over conventional incandescent lamps. Light-emitting diodes have a long serviceable life. When lit, they generate only very little heat and they draw a minimum of energy from the source of power. In addition, they are small and easy to mount. Their operational reliability makes them suitable for use for instance in applications where intermittent or pulsating light is desired. Their flexibility of mounting and of use in combination with their minimum energy consumption make light-emitting diodes very useful in a large number of cases and applications, where conventional electric bulbs are less suitable.

The purpose of th subject invention is to provide a display by means of which it becomes possible to use light-emitting diodes with maximum efficiency in a number of applications. This is achieved in accordance with the teachings of the subject invention in that the diodes which are of the kind designed to be mounted in a dish-shaped reflector formed in a plate are mounted in openings formed in the plate with the diode walls snugly fitted into the edges of the opening to form a mechanical bond between the diodes and the plate, and that the diodes are formed with a wider rear portion by means of which the diodes, when mounted in the plate, are securely wedged thereto.

The method for manufacturing the display comprising light-emitting diodes in accordance with the invention according to which the diodes form a selected pattern and their power is enhanced by reflectors surrounding the individual diodes, is characterized by the steps of mapping the selected pattern on a substratum, determining the coordinate points relating to the positions of the light-emitting diodes to form the selected pattern, recording the coordinates thus determined andusing the recorded data thus received for controlling the movements of means arranged to form impressions in a plate and to punch openings in said impressions for reception therein of the diodes.

The installation for performing the method of manufacturing the display comprising light-emitting diodes in accordance with the invention is characterized by means for determining the coordinates relating to the positions of the light-emitting diodes, means connected to said determining means for recording said coordinates and means for controlling the operations of stamping and punching sign blanks while said means are controlled by the data of the recorded coordinate positions.

Further characteristics of the invention will appear from the dependent claims.

The light-emitting diodes in accordance with the invention have excellent lighting properties. In addition, the emitted light beam is aligned and concentrated.

BRIEF DESCRIPTION OF THE DRAWINGS

The invention will be described in closer detail in the following with reference to the accompanying drawings, wherein FIG. 5 is an end view of the equipment of FIG. 4, and FIGS. 6, 7a and 7b show details of the equipment in accordance with the invention.

DETAILED DESCRIPTION OF THE PREFERRED EMBODIMENT

Figure 1:
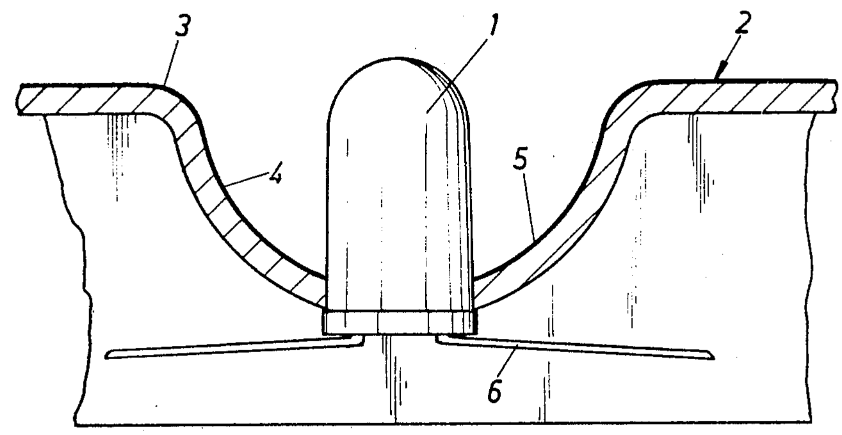
FIG. 1 is a cross-sectional view through a light-emitting diode in accordance with the invention.

FIG. 1 illustrates a light-emitting diode 1 which is positioned in a holder 2. The latter consists of a plate 3 of sheet metal. Preferably, the sheet metal is aluminum plate, which has been exposed to an anodizing treatment, whereby a reflective surface layer 4 forms on the plate.

The diode 1 is mounted in an opening formed in a dish-shaped reflector 5. Diodes typically have a slightly conical configuration, a shape which is a consequence of the fact that in the manufacture of the diodes it must be possible to release the latter from the mould in which they are formed. This conicity of the diodes is made use of in the present invention in that the diodes are mounted from below (in accordance with FIG. 1) in the opening formed in the reflector, in which opening they are wedged securely in position. This becomes possible because the size of the opening is made to match the size of the diode. The wedging force by means of which the diode is secured in the plate opening thus forms a mechanical bond or press fit by means of which the diode is securely retained in the plate 3. The dish-shaped reflector 5 may have a parabolic, semi-spherical or other suitable shape. The connections of the diode 1 consist of rigid rods 6, which extend along the lower face (according to FIG. 1) of the plate 3, which corresponds to the interior of the display, and these rods interconnect the diodes and connect them to a source of current. This is effected preferably by soldering the rods together or soldering them to wires. The manner of interconnection of the diodes and of their connection means to a source of current may be tailor-made to suit the particular needs of each individual application of the invention.

The tight and close abutment of the diode walls against the edges of the opening positively prevents water from leaking in between the walls and the edges into the interior of the display. A rear plate (not shown) is positioned on the bottom (according to FIG. 1) of the display thus forming a box-shaped construction. Also the rear plate could be provided with diodes to form a two-sided sign.

The rigid rods 6 extend along the walls of the display but spaced some distance therefrom, allowing air to circulate freely about the rods. This prevents condensation from forming on the rods 6. In this manner the generation of creeping currents is prevented.

Because of the configuration of the reflector 5 the light emittd from the diode 1 will be reflected in the form of a bundle of aligned beams. In this manner the comparatively weak light emitted from a light-emitting diode will be strengthened with regard to its effect and power in a direction straight outwards from the reflector. No separate transparent glass sheet or similar element need to be provided in front of the diodes since the electric connections and wires are well protected anyway.

Figure 2:
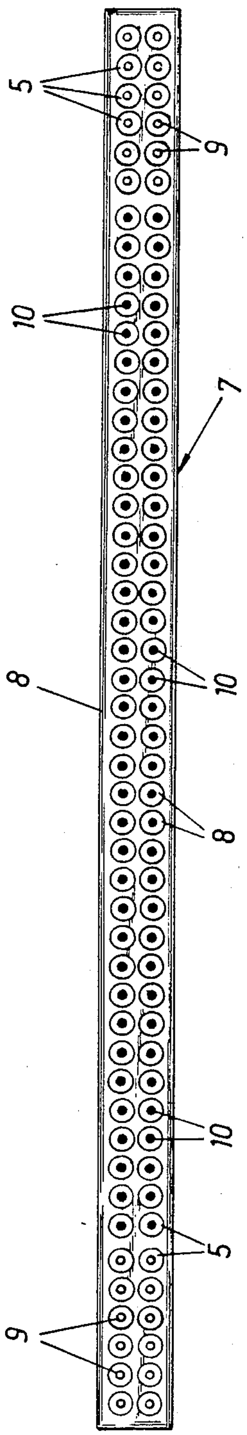
FIG. 2 is a plan view of a practical application of the invention.

FIG. 2 shows one example of a suitable application of the light-emitting diode display in accordance with the invention. FIG. 2 illustrates a signal device 7 in the form of an elongate, rectangular holder 8 in which are formed a number of reflectors 5. In the manner shown in FIG. 1 one light-emitting diode 1 is mounted in each one of these reflectors. At each end of the holder a number of yellow light-emitting diodes 9 are provided. The light-emitting diodes 10, which are positioned intermediate the outermost groups 9 of light-emitting diodes, are red. The holder is intended to be mounted for instance at the rear of cars, in which case the central red light-emitting diodes 10 serve as brake lights whereas the yellow light-emitting diodes 9 at each end of the holder serve as blinkers. A device of this kind could advantageously be mounted in the rear window of cars to supplement the conventional rear lights of the vehicle. In order to achieve the flashing function of the blinker diodes 9 a relay or similar means is coupled between the power source and the diodes.

Figure 4:
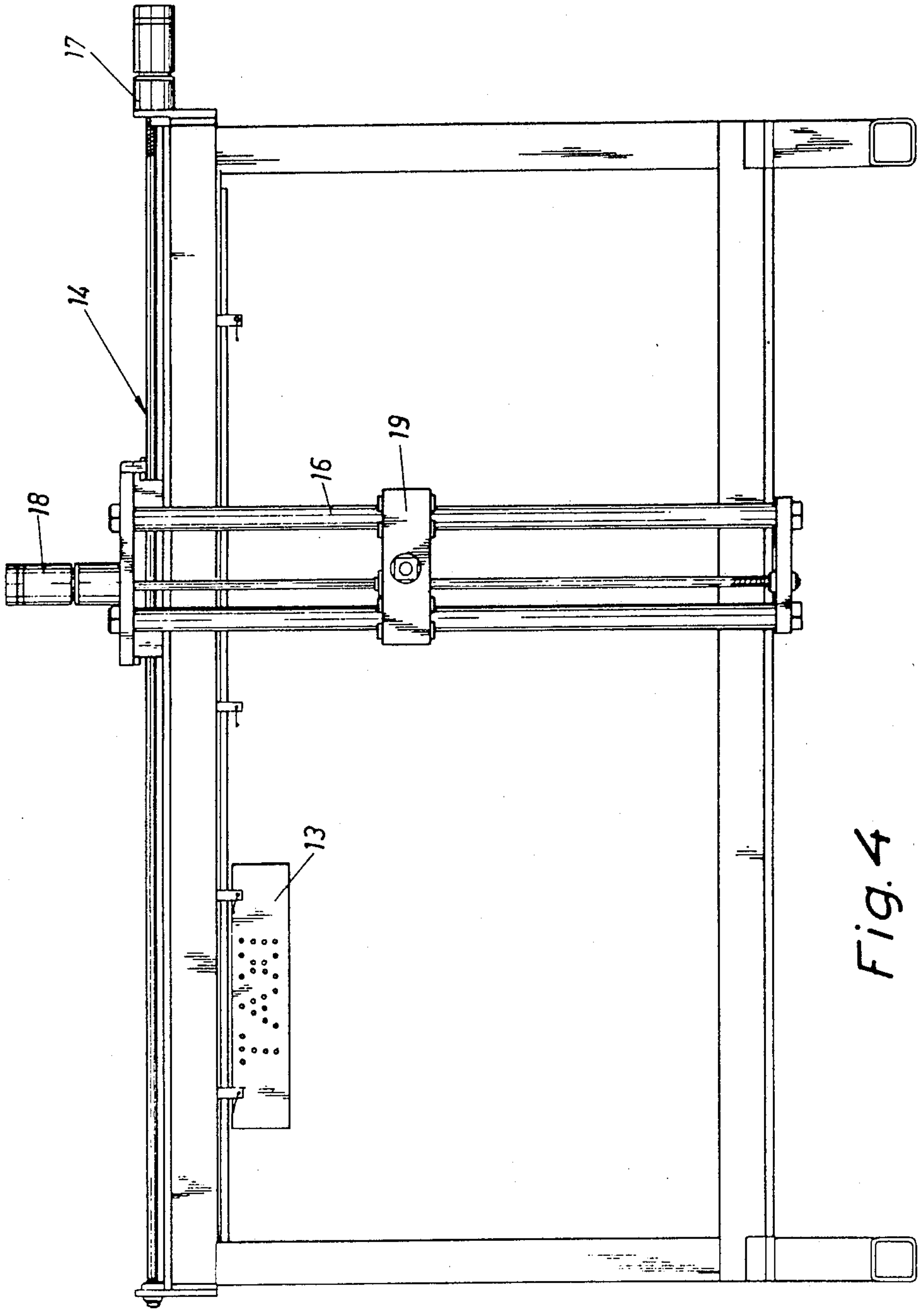
FIG. 4 is a front view of the part of the equipment designed to manufacture the sign itself.

A further example of an advantageous application of the light-emitting diode display in accordance with the invention is shown at the left-hand part of FIG. 4. A conventional sign 13 carries the text formed by light-emitting diodes. The latter are made to emit light continuously or to emit an intermittent light to illuminate the text. In this manner, the diodes may as illustrated cover the entire design to be illuminated or serve as outline-indicators.

The rods 6 may be cast into a filler compound of synthetic-resin material or the like. In this case the material must enclose the rods to prevent condensation from forming on the rods.

Figure 3:
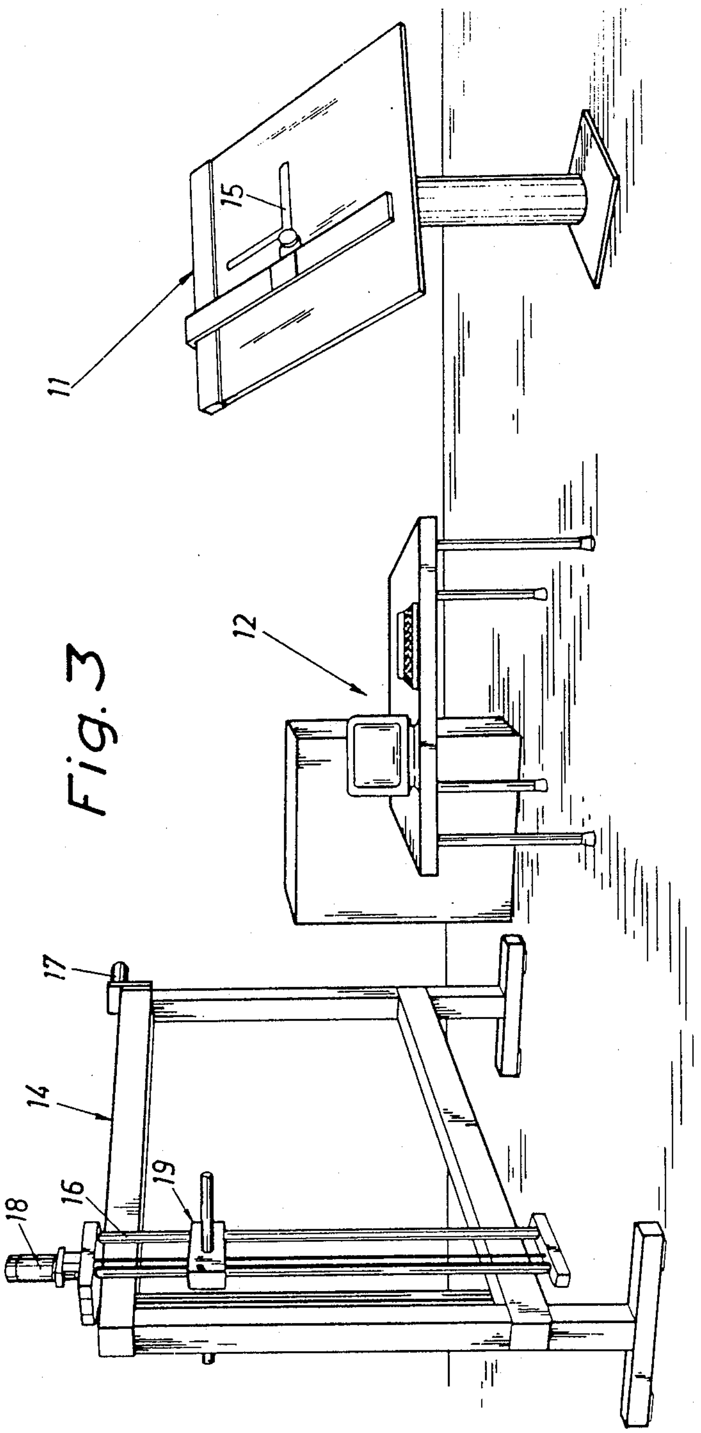
FIG. 3 is a general view giving an overall picture of the equipment designed to perform the method in accordance with the invention.

The plant illustrated in FIG. 3 designed to produce the display in accordance with the invention comprises a drawing board 11, a data processing computer part 12 and a mechanical part 14.

The display to be manufactured, viz. a sign in accordance with the embodiment illustrated (see the plate or sign blank 13 in FIG. 5) carries symbols, e.g. the letters TAXI. The letters are to be made visible by means of light-emitting diodes and the power of the light-emitting diodes 1 is improved by mounting each diode in its individual reflector 5 as described in the aforegoing.

The first stage of the manufacture of the sign 13 consists of applying a templet carrying the chosen text on the drawing board 11 and to determine with the aid of rulers 15 the coordinates indicating the positions of the diodes. The coordinate positions thus determined are automatically supplied to the computer 12 and are recorded in the latter on e.g. a floppy disc. In this connection should be pointed out that the drawing board 11, the computer 12 and the machine 14 are wired together in such a manner as to enable the coordinates to be automatically supplied from the drawing board 11 to the computer 12 and recorded therein on suitable computer memory means. Additionally, the interconnection between computer 12 and machine 14 enables the recorded coordinates to be supplied from the computer memory means to control means and directly utilized thereby to position means for forming impressions and openings relative to a desired workpiece. Such wiring is well known and therefore need not be shown on the drawings as this would unnecessarily clutter the latter and impair the clarity.

The computer 12 is thereafter employed to control the movements of a slide member in the machine, said slide member consisting of two parallel rods 16. The machine comprises a motor 17 to effect the Y-axis coordinate movements and a motor 18 to effect the X-axis coordinate movements of a stamping and punching tool 19 arranged on the slide member. The computer thus controls the operation of the stamping and punching tool proper 19, the latter comprising two blocks 20, 21.

As appears from FIG. 6 these blocks 20, 21 are arranged for movement on their respective rod 16 on either side of the sign 13. The block movements are synchronized so as to ensure that at all times the blocks will be positioned opposite each other. The block 20 comprises an abutment face (see FIG. 6) and will work against the side of the sign intended to form the rear face (the lower face according to Fig. 1). When the two blocks 20, 21 have been positioned as desired on either side of the sign blank 13 the abutment member 22 is moved to a position in abutment against the sheet metal of the sign blank. The abutment member 22 is operated by means of a piston 23 which is movable in a cylinder chamber 24.

The block 21 comprises a clamping jaw 25 operated by means of a piston 26 which is movable in a cylindrical space 27. The clamping jaw 25 moves into abutment against the front face of the sign blank 13, whereby the latter will be clamped between the clamping jaw 25 and the abutment member 22. In this position a stamping die 28 mounted in the interior of the clamping jaw 25 will be forced forwards to make a dish-shaped impression in the sign blank to form the reflector 5. The die 28 is operated by means of a piston 29 movable inside a cylinder 30 (see FIG. **7*b* which is a continuation of FIG. 7*a*). Finally, the opening is punched in the reflector by means of a punching member 31 arranged for movement in the stamping die 28 and operated by means of a piston 32 positioned in a cylinder 33 at the outer end of the block 21. When the formation of the reflector 5 including the central opening therein has been concluded the abutment member 22, the clamping jaw 25, the die 28 and the punching member 31 are moved apart and away from the sign blank 13, whereby the punching and stamping tool 19 without restraint may be moved by means of the motors 17, 18** to the next position in order to shape another reflector in the sign blank. Sensing means (not shown) are preferably provided to sense when the various parts have returned to the correct positions.

When the reflectors 5 have been formed in the sign blank 13 the diodes are mounted in the openings of the reflectors and are forced into the latter until they are securely wedged therein and the mechanical bond (press fit) it established between the diodes 1 and the plate 3. It may be advisable to strengthen the bond by glueing in which case the glue is brushed onto the rear face (as seen in FIG. 1) of the sign blank. The rods 6 are bent to the desired positions and soldered together as required according to the desired coupling diagram. Finally, a rear plate is mounted to finish off the display.

The inention is not limited to the embodiments shown and described but a variety of modifications are possible within the scope of the appended claims. For instance, the slide member 16 may be driven by other means than those shown. The punching and stamping tool preferably are pneumatically operated but hydraulically operated means are likewise feasible. The required packings and seals and other required means of various types are well-known to the artisan in the field and for this reason have not been described herein in order not to unnecessarily lengthen the description.

The coordinates may be determined by other means than rulers.

What I claim is:

1. An improved method of manufacturing displays incorporating light-emitting diodes, wherein said light-emitting diodes form a selected pattern and their power are enhanced by reflectors surrounding the individual light-emitting diodes, said method comprising mapping the selected pattern on a substratum, determining a series of coordinate points on the substratum relating to the positions of the light-emitting diodes to form the selected pattern, automatically recording the series of coordinates thus determined in computer memory means;

supplying said recorded series of coordinates from said computer memory means to control means and directly utilizing said series of recorded coordinates to successively position backing means and means for forming impressions and openings in said impressions in aligned relationship on opposite sides of a plate;

successively actuating said means for forming impressions and openings as positioned so as to thereby form said impressions and said openings in said plate substantially at each of said series of coordinates;

inserting said diodes in each of said openings; and interconnecting said diodes in a desired manner.

2. Apparatus for manufacturing displays incorporating light-emitting diodes and formed with impressions in which are positioned said light-emitting diodes to form a selected pattern, said machine comprising means for determining the coordinates relating to the positions of said light-emitting diodes, means connected to said determining means for automatically receiving and recording said coordinates, and support means for supporting a sign blank in which aid impressions are to be formed;

first block means movably supported on first guide means in opposing relationship to one surface of said blank and second block means movably supported on second guide means in opposing relationship to another surface of said blank and aligned with said first block means, one of said first and second block means carrying an abutment surface and the other carrying stamping and punching means;

said receiving and recording means including control means operatively associated with said stamping and punching means for moving said first and second blocks in synchronized relationship and positioning said stamping and punching means and said abutment surface substantially at successive ones of said coordinate positions in response to receipt of said coordinates from said receiving and recording means and actuating said stamping and punching means to form impressions and openings in said impressions in said sign blank.

* * * * *